United States Patent
Lear et al.

(10) Patent No.: US 11,374,981 B2
(45) Date of Patent: Jun. 28, 2022

(54) SOFTWARE USAGE DESCRIPTION (SUD) FOR INSTALLABLE APPLICATIONS

(71) Applicant: Cisco Technology, Inc., San Jose, CA (US)

(72) Inventors: Eliot Lear, Zurich (CH); Owen Friel, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 16/746,323

(22) Filed: Jan. 17, 2020

(65) Prior Publication Data
US 2021/0226995 A1    Jul. 22, 2021

(51) Int. Cl.
*H04L 9/40* (2022.01)
*G06F 8/61* (2018.01)
*G06F 21/57* (2013.01)

(52) U.S. Cl.
CPC .............. *H04L 63/20* (2013.01); *G06F 8/61* (2013.01); *G06F 21/572* (2013.01); *H04L 63/0236* (2013.01); *G06F 2221/033* (2013.01)

(58) Field of Classification Search
CPC ....... H04L 63/20; H04L 63/0236; G06F 8/61; G06F 21/572
See application file for complete search history.

(56) References Cited

U.S. PATENT DOCUMENTS

| | | |
|---|---|---|
| 6,915,338 B1 | 7/2005 | Hunt et al. |
| 7,080,143 B2 | 7/2006 | Hunt et al. |
| 8,161,521 B1* | 4/2012 | Venable, Sr. ........... H04L 63/20 726/1 |
| 9,602,539 B1 | 3/2017 | Bharali |
| 10,298,581 B2 | 5/2019 | Shah et al. |
| 10,404,750 B2 | 9/2019 | Bharali |
| 2005/0021697 A1 | 1/2005 | Hunt et al. |
| 2006/0069758 A1 | 3/2006 | Hunt et al. |
| 2013/0151848 A1* | 6/2013 | Baumann .............. H04L 9/3263 713/164 |
| 2014/0109078 A1* | 4/2014 | Lang ....................... G06F 21/33 717/172 |

(Continued)

OTHER PUBLICATIONS

Hamza, et al., "Combining MUD Policies With SDN for IOT Intrusion Detection," retrieved as early as Aug. 24, 2018 at <<https://www.researchgate.net/publication/326762047>>, ResearchGate, Aug. 20, 2018, 7 pages.

*Primary Examiner* — Jason Chiang
(74) *Attorney, Agent, or Firm* — Lee & Hayes, P.C.

(57) ABSTRACT

This disclosure describes techniques for providing manufacturer usage description (MUD) solution to automatically update network access policy for client application software. The method may include embedding metadata in the application binary. The metadata may include MUD uniform resource identifiers (URIs) that may point to MUD files describing the application's network access requirements. The MUD files may be hosted by application vendor's MUD servers. The system may include a network policy server that is able discover the MUD URIs. The MUD URIs may be discovered based on extracting the MUD URIs from the metadata and/or being provision with the set of MUD URIs for trusted applications. The method may include enterprise wide policy and individual host policy for implementation of the MUD files.

20 Claims, 7 Drawing Sheets

(56) References Cited

U.S. PATENT DOCUMENTS

| | | | | |
|---|---|---|---|---|
| 2016/0127351 A1* | 5/2016 | Smith | ............... | H04L 63/12 |
| | | | | 726/10 |
| 2016/0283362 A1* | 9/2016 | Seto | ............... | G06F 16/2455 |
| 2017/0033984 A1* | 2/2017 | Lear | ............... | H04L 67/34 |
| 2018/0115611 A1* | 4/2018 | Lear | ............... | H04L 61/1541 |
| 2018/0316563 A1* | 11/2018 | Kumar | ............... | H04L 41/0853 |
| 2018/0316673 A1* | 11/2018 | Shah | ............... | H04W 12/35 |
| 2018/0332053 A1* | 11/2018 | Weis | ............... | H04L 63/104 |
| 2019/0110298 A1* | 4/2019 | Lear | ............... | H04W 48/16 |
| 2019/0138469 A1* | 5/2019 | Lee | ............... | G06F 13/4282 |
| 2019/0253319 A1* | 8/2019 | Kampanakis | ............... | H04L 41/0816 |
| 2019/0288913 A1* | 9/2019 | Salgueiro | ............... | H04L 41/082 |
| 2019/0319861 A1* | 10/2019 | Pan | ............... | H04L 9/0637 |
| 2019/0319953 A1* | 10/2019 | Lear | ............... | H04L 63/102 |
| 2020/0137119 A1* | 4/2020 | Jin | ............... | H04L 63/107 |
| 2020/0145409 A1* | 5/2020 | Pochuev | ............... | H04L 63/061 |
| 2021/0006642 A1* | 1/2021 | He | ............... | H04L 65/1069 |
| 2021/0218551 A1* | 7/2021 | Moriarty | ............... | H04L 63/0421 |
| 2021/0219353 A1* | 7/2021 | Montemurro | ............... | H04L 67/16 |

\* cited by examiner

SOFTWARE USAGE DESCRIPTION (SUD) FOR INSTALLABLE APPLICATIONS

TECHNICAL FIELD

The present disclosure relates generally to providing embedded manufacturer usage description (MUD) files for software applications.

BACKGROUND

Enterprise networks often use central software management tools to deploy applications to their connected host devices. The host devices include desktops, typically running Windows or MacOS, mobile devices, typically running Android and iOS, and a variety of other systems, including smart televisions and programmable logic controllers. Central software management tools include mobile device management (MDM) for mobile applications, Active Directory (AD) Group Policy for Windows applications, and other application management platforms.

Different applications require different sorts of network access. In some instances, the client software can include complex access requirements requiring multiple ports to be opened and multiple domains to be whitelisted in enterprise firewalls. These complex access requirements can create a significant management issue when enterprise networks have strict firewall rules in place and the new versions of client software need access to new domains and ports [alternative: These complex access requirements are not well understood by enterprise network administrators. This leads to either over- or under-provisioning of network access.].

For instance, when a particular client software upgrade is rolled out, customers may have to manually update their firewall rules. Often, these firewall rules updates happen after the fact, when a new version of the client software failed to function correctly because the required ports and domains are not open on the firewall. This issue is compounded by the fact that enterprise networks deploy software that are provided by multiple independent software vendors, each with their own unique access requirements. Accordingly, it may be advantageous to provide an automated mechanism to update network access and firewall rules based on roll out and based on deployment of the client software.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
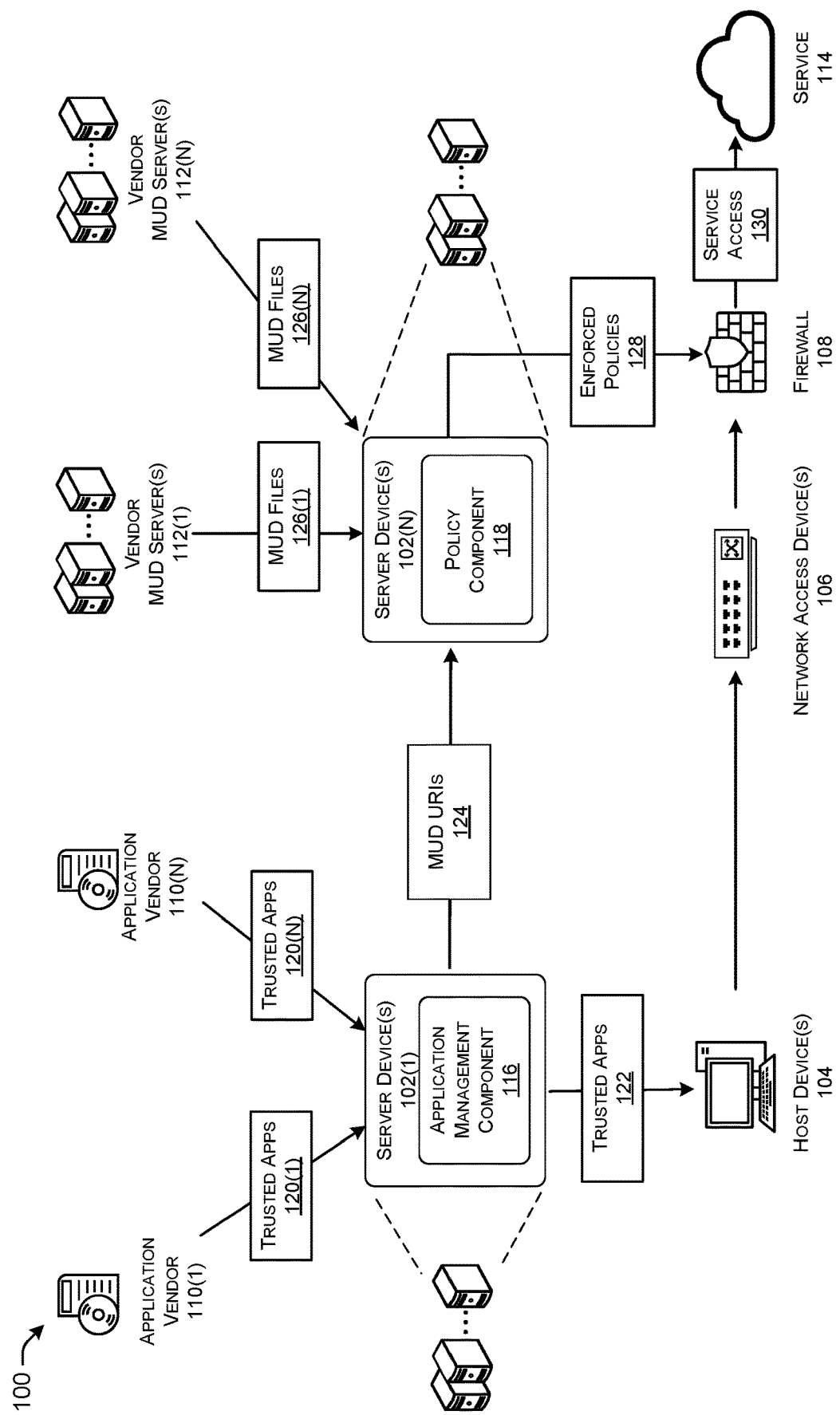
FIG. 1 illustrates a system-architecture diagram of an example system for an enterprise wide policy implementation of manufacturer usage description (MUD) files for trusted applications.

This disclosure describes techniques for providing manufacturer usage description (MUD) solution for installable software applications. The method includes MUD uniform resource identifiers (URIs) that could be included in the application metadata, embedded in the application binary, and/or embedded in the application code signing certificate. The MUD URIs could point to the MUD files that describe the application's network access requirements. The method further includes enabling a network policy server to discover the MUD URIs. The MUD URIs may be discovered based on extracting the MUD URIs from trusted applications and/or being provision with the set of MUD URIs for trusted applications. Further, the method includes enterprise wide policy and individual host policy for implementation of the MUD files.

Additionally, the techniques described herein may be performed by a system and/or device having non-transitory computer-readable media storing computer-executable instructions that, when executed by one or more processors, performs the method described above.

Example Embodiments

The usefulness of software applications that utilize network resources, from the sophistication of applications and the popularity of cloud services, has resulted in greater need for software that can automatically enforce and update network policy rules, in an enterprise network, based on software updates and deployment. By leveraging manufacturer usage description (MUD) solutions for software application, referred herein as software usage description (SUD), network access requirements can be supported automatically. In examples, a MUD uniform resource identifiers (URIs) could be included in the application metadata or embedded in the application binary. Additionally, and/or alternatively the MUD URIs could be embedded in the application code signing certificate.

In some examples, the MUD URIs could point to the MUD files that describes the application's network access requirements. The MUD files could be hosted by the respective software vendors MUD servers. After the initial installation, by allowing the respective software vendors to host their own MUD files, when a software application is updated and the new version has different access requirements, the access requirements can be automatically supported because the MUD files can be generated by the software vendor.

In various examples, the enterprise network may include a network policy server with one or more mechanisms to discover the MUD URIs. In an example, an enterprise application management platform (MDM, AD Group Policy, etc.) may extract the MUD URIs from trusted applications and provides these to network policy servers. In another example, the network policy server may request a set of trusted applications from an application management platform and extract the MUD URIs. In additional examples, the network policy server is manually provisioned with the set of MUD URIs for trusted applications.

In some examples, the enterprise network may run multiple versions of the same application on different host devices. Because each application version may be embedded with a corresponding MUD URI, the different application versions can have unique MUD URIs pointing to unique MUD files with version-specific access rules. To maintain the MUD URIs pointers for the different unique MUD files, the application management platform may maintain a corresponding copy of each required versions of application software to extract the MUD URIs. After receiving the MUD files, the network policy server may include one or more options to implement the policy rules in the MUD files.

In some examples, the network policy server may include an enterprise wide policy that combines the MUD files using any policy combining schemes and/or logic (e.g., union of the rules for a specific user group, intersection of the rules for all user groups, allow certain rule types, etc.) for all trusted applications and opens up a superset of the rules on network and firewalls. The enterprise wide policy may allow all users and/or host devices to traverse the firewall and to access all required ports and domains. Accordingly, a specific user or client machine may not have all applications installed but the firewall does not attempt to limit access to just the subset of ports and domains for the subset of installed applications. In the present example, the network policy server does not need to have visibility on the applications that are installed on specific user or client machines.

In various examples, the network policy server may include individual host policy for implementation of the MUD files based on host device installation. In some examples, the host device may directly install an application on the host device and the host device may send an application installation report to the application management platform with details on the applications and/or application versions installed. If the host device is running a Trusted Execution Environment (TEE) then the application installation report may include a signed assertion from a trust root established within the TEE.

In additional examples, the network policy server may include individual host policy for implementation of the MUD files based on the application management platform deploying applications to host devices. In the present example, the application management platform may maintain an installation log to identify one or more of the application versions, host devices, and user associated with an application installation. The network policy server may integrate with the application management platform to dynamically discover at network access time what applications a specific user and/or host device has installed. The host may connect to the network and are authenticated using 802.1X or MAC Address Bypass or some suitable mechanism. In some examples, the network policy server may identify the user or client machine and query the application management platform to determine what applications are installed on that machine. For instance, the network policy server may determine that user X has applications A, B, D installed. The network policy server may dynamically merge the MUD files for applications A, B, D. In one example, policies A, B, and C, all explicitly permit access, and may be appended together to form an aggregate policy. The network policy server enforces correct policy on the network and firewall for the application profile specific to that machine.

Although the techniques described herein are primarily with reference to client software applications, the techniques are generally applicable to any installable software application, including operating systems, system management software, database software, communications software, and the like. Further, while some techniques are described with reference to virtual servers, the techniques are equally application to any distributed servers that is deployed on top of a cluster of physical servers.

The techniques described herein provide various improvements and efficiencies with respect to enterprise application management platform. For example, the techniques described herein may reduce the amount of time for client application software update roll out or deployment in an enterprise network by automatically enforcing or updating network policy rules. The system implements embedding MUD URIs in application binary or metadata that are signed by vendor code signing certificates, or included in software bills of materials, which enables a network policy server to integrate with an enterprise application management platform to automatically enforce and update network policy rules. This enables end-users to use these applications to access internet services without requiring network and firewall rules to be explicitly provisioned, thus reduce time for roll out or deployment. Moreover, the system works across multiple software vendors and avoids the need for a central Manufacturer Application Server that must track and manage MUD files across all applications. Thus, the system may reduce the need for additional managing servers and performing additional authentications processes.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example system 100 for an enterprise wide policy implementation of manufacturer usage description (MUD) files for trusted applications.

In some examples, the example system 100 may include an enterprise network that includes an array of server device(s) 102(1)-102(N) ("server devices 102"), where N is any integer greater than "1", the host device(s) 104, the network access device(s) 106, and the firewall 108. The server devices 102, the host device(s) 104, the network access device(s) 106, and the firewall 108 may be in stored in data centers located across geographic areas. The example system 100 may be an enterprise network through which the server devices 102 may deploy client software onto host device(s) 104 for applications that may require access to cloud service 114. The example system 100 may include manufacturer usage description (MUD) solutions for installable software application. In the example system 100, a MUD uniform resource identifiers (URIs) may be included in the application metadata or embedded in the application binary. Additionally, and/or alternatively the MUD URIs could be embedded in the application code signing certificate.

The host device(s) 104 may include any user and/or client devices connected to the enterprise network. Examples of the host device(s) 104 can include, but are not limited to, smart phones, mobile phones, cell phones, tablet computers, portable computers, desktop computers, workstations, laptop computers, personal digital assistants (PDAs), electronic book devices, or any other portable electronic devices that can generate, request, receive, transmit, or exchange voice, video, and/or digital data over a network. Additional examples of the host device(s) 104 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

The network access device(s) 106 may include any router, switch, wireless access point or network gateway device implemented as one or more routing device to facilitate communications by and between the various devices in the system 100.

As presented visually in FIG. 1, the server device(s) 102(1) and the server device(s) 102(N) are separated for clarity to illustrate functionality of application management platform and network policy server, but the server devices 102 may include functionality for both the application management platform and the network policy server.

The server devices 102 may include the application management component 116 and the policy component 118. The server device(s) 102(1) can receive trusted applications 120 from application vendor 110(1)-110(N) ("application vendors 110"), where N is any integer greater than "1," via one or more network.

The application management component 116 may include functionality to receive trusted applications from the application vendors 110 and deploy the trusted applications to host device(s) 104. The application management component 116 may maintain an installation log to identify one or more of the applications, versions, host devices, and user associated with the application deployment. Accordingly, the policy component 118 may integrate with the application management component 116 to dynamically discover at network access time what applications a specific user and/or host device has installed. To maintain the MUD URIs pointers for the different unique MUD files, the application management component 116 may maintain a corresponding copy of each required versions of application software to extract the MUD URIs.

The application management component 116 may include functionality to extract the MUD URIs from trusted applications and provides these to policy component 118.

The policy component 118 may include functionality to discover the MUD URIs. As described herein, the application management component 116 may extract the MUD URIs from trusted applications and provides these to policy component 118. In another example, the policy component 118 may request a set of trusted applications from an application management component 116 and extract the MUD URIs. In additional examples, the policy component 118 may be manually provisioned with the set of MUD URIs for trusted applications.

The policy component 118 may discover the MUD URIs that could point to the MUD files that describes the application's network access requirements. The MUD files could be hosted by the respective software vendors MUD servers. Thus, the policy component 118 can receive MUD files 126 from vendor MUD server(s) 112(1)-112(N) ("vendor MUD servers 112"), where N is any integer greater than "1," via one or more network. After receiving the MUD files, the policy component 118 may include one or more options to implement the policy rules in the MUD files.

In some examples, the policy component 118 may include an enterprise wide policy that merges or unions the MUD files for all trusted applications and opens up a superset of the rules on network and firewalls. In one example, access-lists in MUD files that contain only permit statements may be appended to one another, and certain enterprise limiting policies may be placed in front. The enterprise wide policy may allow all users and/or host devices to traverse the firewall and to access all required ports and domains. Accordingly, a specific user or client machine may not have all applications installed but the firewall does not attempt to limit access to just the subset of ports and domains for the subset of installed applications. In the present example, the policy component 118 does not need to have visibility on the applications that are installed on specific user or client machines.

In various examples, the policy component 118 may include individual host policy for implementation of the MUD files based on host device installation. In some examples, the host device may directly install an application on the host device and the host device may send an application installation report to the application management component 116 with details on the applications and/or application versions installed. If the host device is running a Trusted Execution Environment (TEE) then the application installation report may be a signed assertion.

In additional examples, the policy component 118 may include individual host policy for implementation of the MUD files based on the application management component 116 deploying applications to host devices. The policy component 118 may integrate with the application management component 116 to dynamically discover at network access time what applications a specific user and/or host device has installed. The host may connect to the network and are authenticated using 802.1X or MAC Address Bypass or some suitable mechanism. In some examples, the policy component 118 may identify the user or client machine and query the application management component 116 to determine what applications are installed on that machine.

As a non-limiting example, the example trusted applications 120 from the application vendors 110 may be provisioned on the application management component 116. The application management component 116 may select one or more trusted applications 122 of the trusted applications 120 and may deploy the one or more trusted applications 122 to the host device(s) 104. The policy component 118 may receive the example MUD URIs 124 that are embedded in the trusted applications 120. Using the example MUD URIs 124, the policy component 118 may retrieve the example MUD files 126 that are hosted by the application vendors 110 on their corresponding vendor MUD server(s) 112. In this present enterprise wide policy examples, the policy component 118 may combine and/or otherwise unionize policies from the MUD files 126 retrieved for the trusted applications 120, and perform enforce policies 128 on the firewall 108 for all users and/or machines (e.g., all host device(s) 104) on the network. This enterprise wide policy enforces policies for even applications that are not installed on the host device(s) 104 (e.g. applications from the trusted applications 120 excluding the one or more trusted applications 122). Thus, all applications from the trusted applications 120 that has the embedded MUD URIs and associated MUD files may access service 130 from the cloud service 114.

Figure 2:
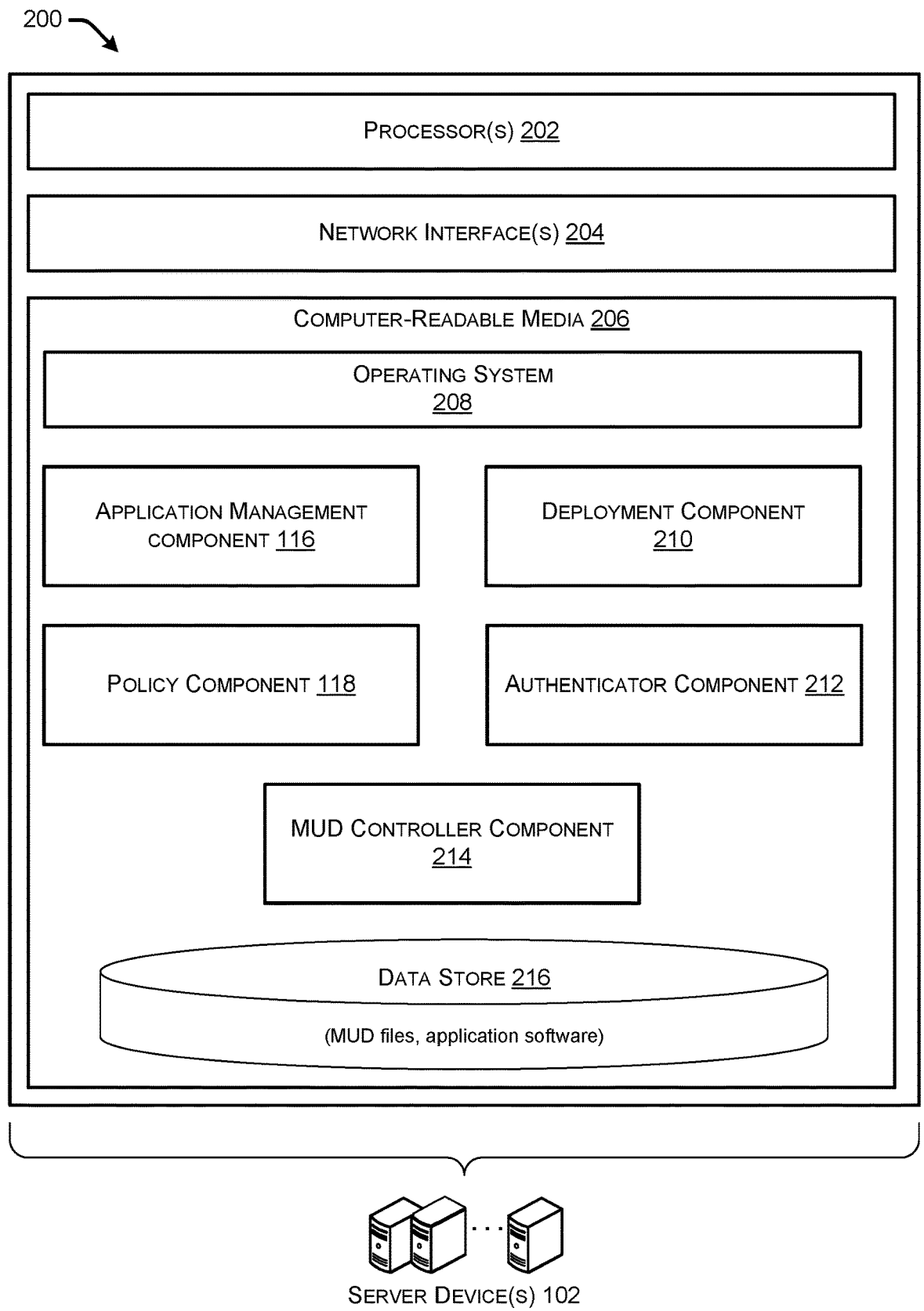
FIG. 2 is a block diagram of an illustrative computing architecture for implementing a server device that can be utilized to implement aspects of the various technologies presented herein.

FIG. 2 is a block diagram of an illustrative computing architecture 200 for implementing a server device(s) 102 that can be utilized to implement aspects of the various technologies presented herein. The computing architecture 200 may be implemented in a distributed or non-distributed computing environment.

The computing architecture 200 may include one or more processor(s) 202, one or more network interfaces 204, and one or more computer-readable media 206 that stores various modules, data structures, applications, programs, or other data. As illustrated, the computing architecture 200 may include one or more hardware processors 202 (processors) configured to execute one or more stored instructions. The processor(s) 202 may comprise one or more cores. Further, the computing architecture 200 may include one or more network interfaces 204 configured to provide communications between the server device(s) 102 and other devices and/or devices associated with vendors and service providers, such as the application vendors 110, the vendor MUD servers 112, the cloud service 114, and communications between other devices in the system 100 (e.g., host device(s) 104, network access device(s) 106, firewall 108, etc.). The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth. The computer-readable media 206 may include instructions that, when executed by the one or more processor(s) 202, cause the processors to perform the operations described herein for the system 100.

The computer-readable media 206 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 206 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

The computing architecture 200 may include computer-readable media 206 that stores one or more operating systems 208. The operating system(s) 208 may generally support basic functions of the server device(s) 102, such as scheduling tasks on the devices, executing applications on the devices, controlling peripheral devices, and so forth. In some embodiments, the computer-readable media 206 may further store the application management component 116, the deployment component 210, the policy component 118, the MUD controller component 214, the authenticator component 214, and the data store 216, which are described in turn. The components may be stored together or in a distributed arrangement.

As discussed herein, the application management component 116 may include functionality to receive trusted applications from vendors and deploy the trusted applications to user or client machines (e.g., host device(s) 104). The application management component 116 may maintain an installation log to identify one or more of the applications, versions, host devices, and user associated with the application deployment. In some examples, in order to maintain the MUD URIs pointers for the different unique MUD files, the application management component 116 may maintain a corresponding copy of each required versions of application software to extract the MUD URIs.

The deployment component 210 may integrate with the application management component 116 to include functionality to deploy the trusted applications to user or client machines. The deployment component 210 may further determine if updated software roll out needs to be deployed to a specific host device based on the version of the software installed.

The policy component 118 may implement functionality to enforce network policies. As discussed herein, the policy component 118 may discover the MUD URIs that could point to the MUD files that describes the application's network access requirements. The MUD files could be hosted by the respective software vendors MUD servers. After receiving the MUD files, the policy component 118 may include one or more options to implement the policy rules in the MUD files. As discussed herein, the policy component 118 may include an enterprise wide policy that merges or unions the MUD files for all trusted applications and opens up a superset of the rules on network and firewalls. The enterprise wide policy may allow all users and/or host devices to traverse the firewall and to access all required ports and domains.

In some examples, the policy component 118 may include individual host policy for implementation of the MUD files based on host device installation. In some examples, the host device may directly install an application on the host device and the host device may send an application installation report to the application management component 116 with details on the applications and/or application versions installed. If the host device is running a Trusted Execution Environment (TEE) then the application installation report may be a signed assertion.

In some examples, the policy component 118 may include individual host policy for implementation of the MUD files based on the application management component 116 deploying applications to host devices. The policy component 118 may integrate with the application management component 116 to dynamically discover at network access time what applications a specific user and/or host device has installed. The host may connect to the network and are authenticated using 802.1X or MAC Address Bypass or some suitable mechanism. In some examples, the policy component 118 may identify the user or client machine and query the application management component 116 to determine what applications are installed on that machine.

The authenticator component 212 may implement functionality to provide authentication, authorization, and accounting (AAA) services. The authenticator component 212 includes handling user requests for access to computer resources and, for an enterprise networks, provides AAA services. The AAA services typically interacts with network access and gateway servers and with databases and directories containing user information. The standard to communicate with the AAA services is the Remote Authentication Dial-In User Service (RADIUS). In some instance, the system may encapsulate the MUD URIs in a Radius packet, and sends it to the authenticator component 212. The authenticator component 212 may passes this URI onto the MUD controller component 214.

The MUD controller component 214 may implement functionality to contact the internet hosted MUD servers of the application vendor (e.g., vendor MUD server(s) 112) that the URI points to over HTTPS. After verifying that the MUD file was generated by the application vendor, the MUD file corresponding to that application is sent to the MUD controller component 214. In some examples, the MUD controller component 214 may be an integrated component for the policy component 118 to retrieve MUD files for the policy component 118.

The server device(s) 102 may include a data store 216 that is stored on a server of the server devices 102, or across multiple server device(s) of the server devices 102. The data store 216 may include a file store that includes one or more images may comprise static files that include executable code to run an isolated process, such as virtual machine image, authentication server image, etc. The images may comprise system libraries, system tools, and other platform settings a software program needs to run on a virtualized platform.

The data store 216 may further store the trusted application software, installation data, the MUD files, and the like. The trusted application software may comprise more than one version of the software. The installation data may comprise various types of data indicating locations of the host devices, the user(s) associated with the host device(s), and the applications and versions installed on the host device(s), and the like.

Figure 3:
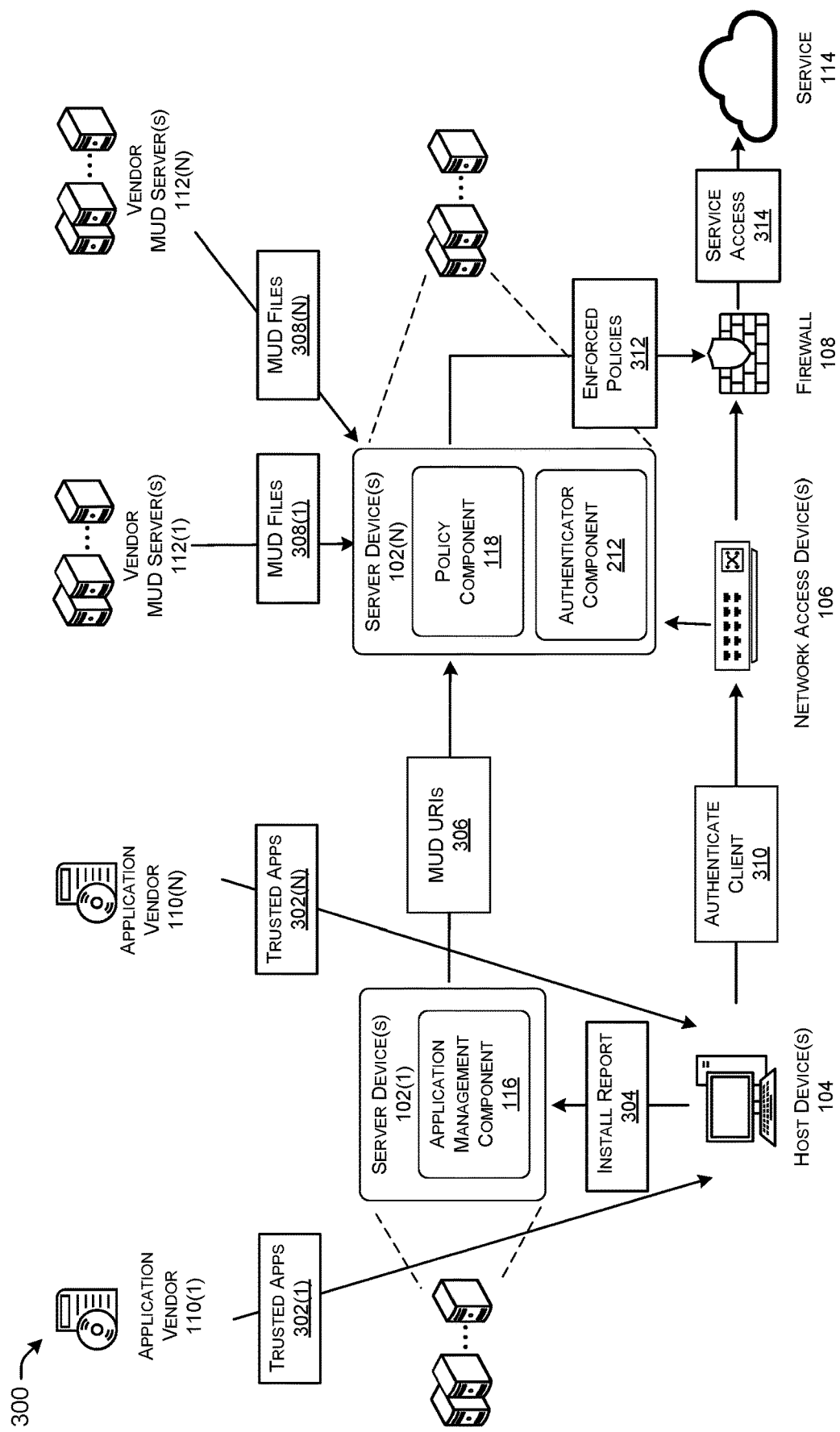
FIG. 3 illustrates a system-architecture diagram of an example system for an individual host policy implementation of MUD files for trusted applications requested by the host device.

FIG. 3 is a system-architecture diagram of an example system 300 for an individual host policy implementation of MUD files for trusted applications requested by the host device.

In some examples, the devices, components, and service (e.g., server devices 102, . . . , the service 114), from FIG. 1, can correspond to the similarly labeled devices, components, and service in FIG. 3.

As a non-limiting example, the example trusted applications 302 from the multiple application vendors 110 may be installed on the host device(s) 104, based on a request sent from the host device(s) 104. The host device(s) 104 may send an application installation report 304 to the application management component 116. In some instances, the application installation report 304 may include details on the applications and/or application versions installed. If the host device(s) 104 is running a Trusted Execution Environment (TEE) then the application installation report 304 may include a signed assertion. The policy component 118 may receive the example MUD URIs 306 that are embedded in the trusted applications 302. Using the example MUD URIs 306, the policy component 118 may retrieve the example MUD files 308 that are hosted by the application vendors 110 on their corresponding vendor MUD server(s) 112.

In the present example, the host device(s) 104 may send an authenticate client 310 requesting network access to the network access device(s) 106. The network access device(s) 106 may interact with the authenticator component 212 to authenticate the host device(s) 104 for the requested network access. The authenticator component 212 may instruct the policy component 118 to apply the MUD files 308 policy for the host device(s) 104.

In some examples, the policy component 118 may determine the specific applications deployed on the host device(s) 104 (e.g., by querying the application management component 116) and may also combine and/or otherwise unionize policies from the MUD files retrieved for the specific applications deployed, and perform enforce policies 312 on the firewall 108 for all users and/or client machines on the network. Thus, the specific applications may access service 314 from the cloud service 114.

Figure 4:
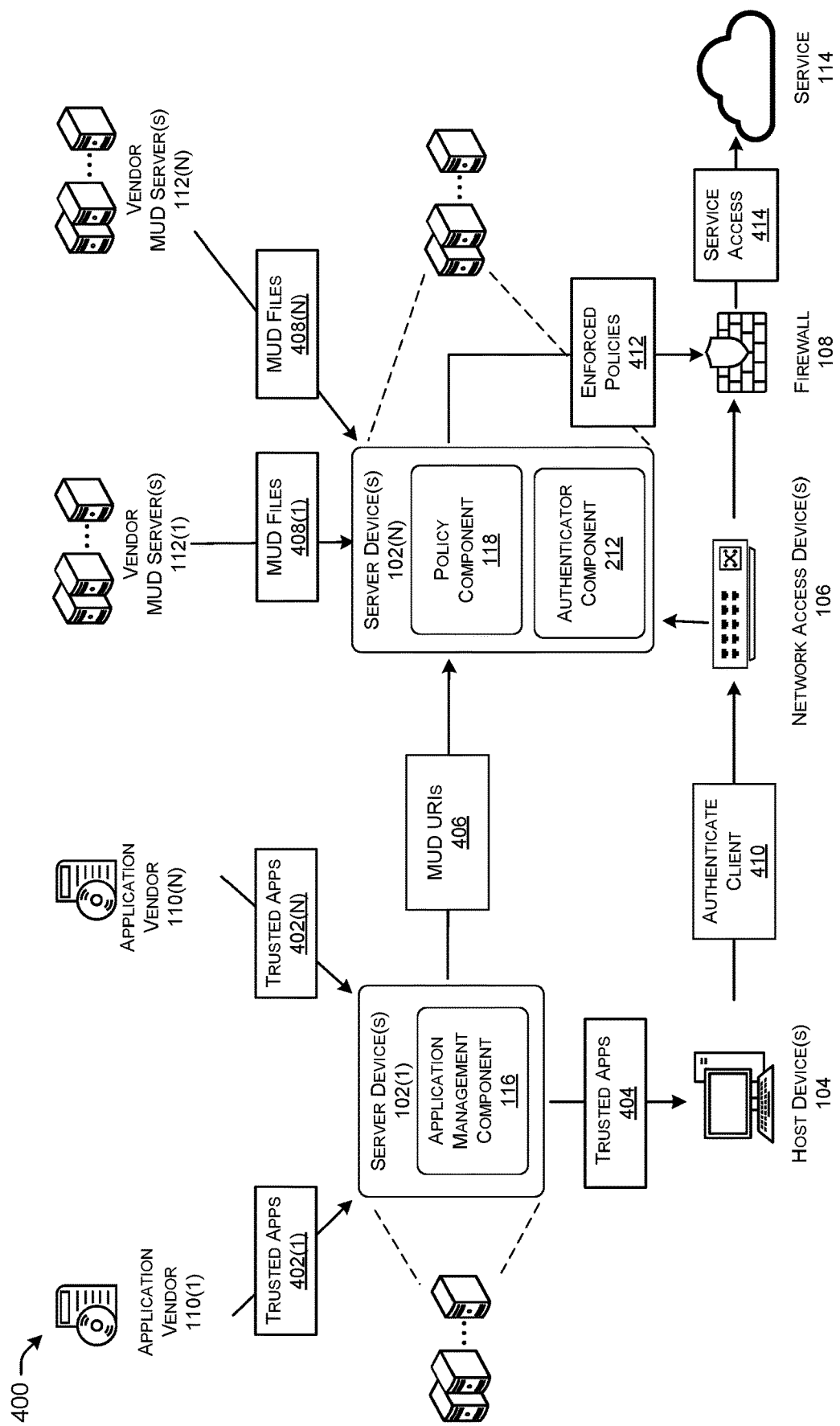
FIG. 4 illustrates a system-architecture diagram of an example system for an individual host policy implementation of MUD files for trusted applications pushed to the host device.

FIG. 4 is a system-architecture diagram of an example system 300 for an individual host policy implementation of MUD files for trusted applications pushed to the host device.

In some examples, the devices, components, and service (e.g., server devices 102, . . . , the service 114), from FIG. 1, can correspond to the similarly labeled devices, components, and service in FIG. 4.

As a non-limiting example, the example trusted applications 402 from the application vendors 110 may be provisioned on the application management component 116. The application management component 116 may select one or more trusted applications 404 of the trusted applications 402 and may deploy the one or more trusted applications 404 to the host device(s) 104. The policy component 118 may receive the example MUD URIs 406 that are embedded in the trusted applications 402. Using the example MUD URIs 406, the policy component 118 may retrieve the example MUD files 408 that are hosted by the application vendors 110 on their corresponding vendor MUD server(s) 112.

In the present example, the host device(s) 104 may send an authenticate client 410 requesting network access to the network access device(s) 106. The network access device(s) 106 may interact with the authenticator component 212 to authenticate the host device(s) 104 for the requested network access. The authenticator component 212 may instruct the policy component 118 to apply the policies in the MUD files 408 for the host device(s) 104.

In some examples, the policy component 118 may determine the specific applications deployed on the host device(s) 104 (e.g., by querying the application management component 116) and may also combine and/or otherwise unionize policies from the MUD files retrieved for the specific applications deployed, and perform enforce policies 412 on the firewall 108 for all users and/or client machines on the network. Thus, the specific applications may access service 414 from the cloud service 114.

Figure 5:
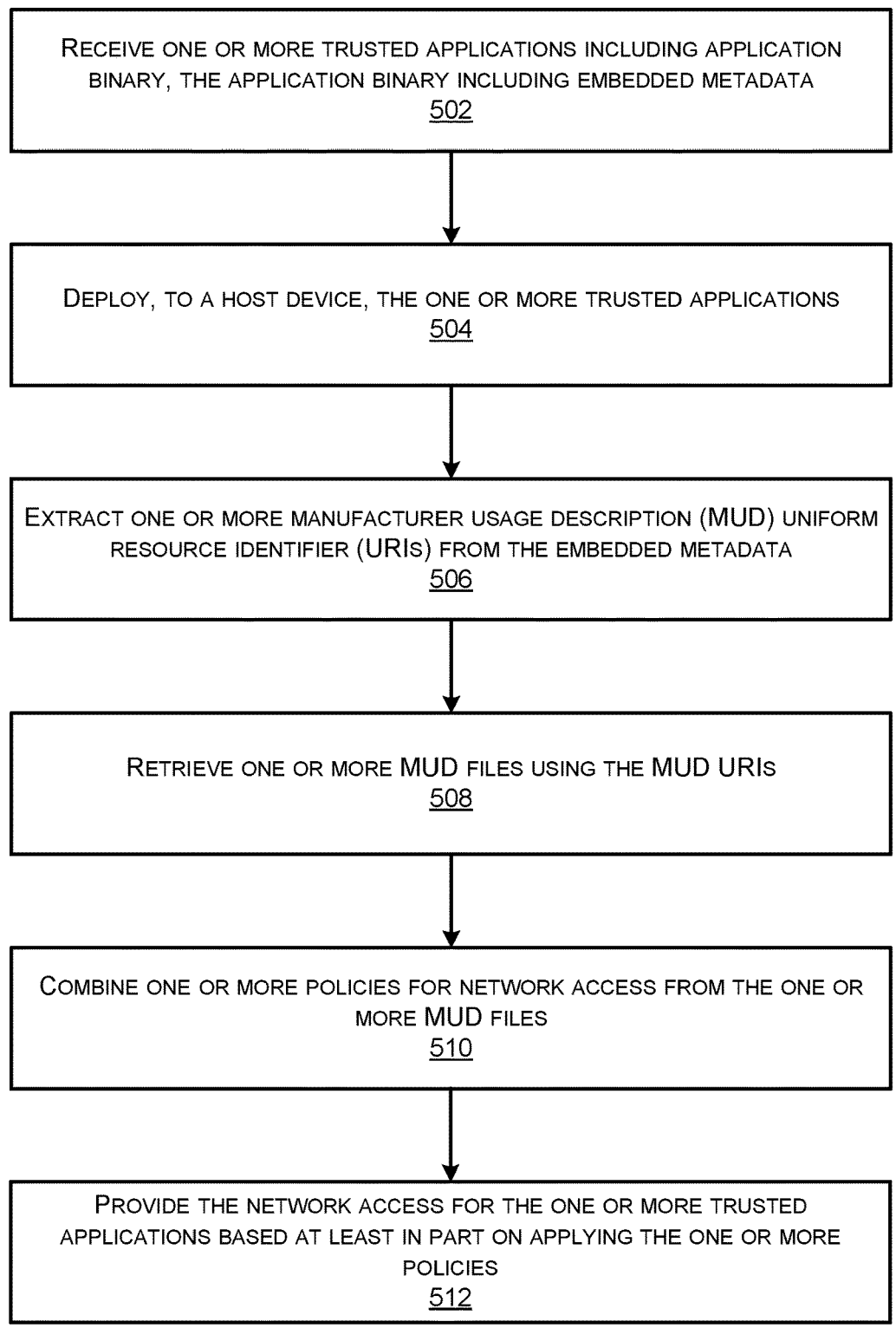
FIG. 5 illustrates a flow diagram of an example method for an enterprise wide policy implementation of the MUD files.
Figure 6:
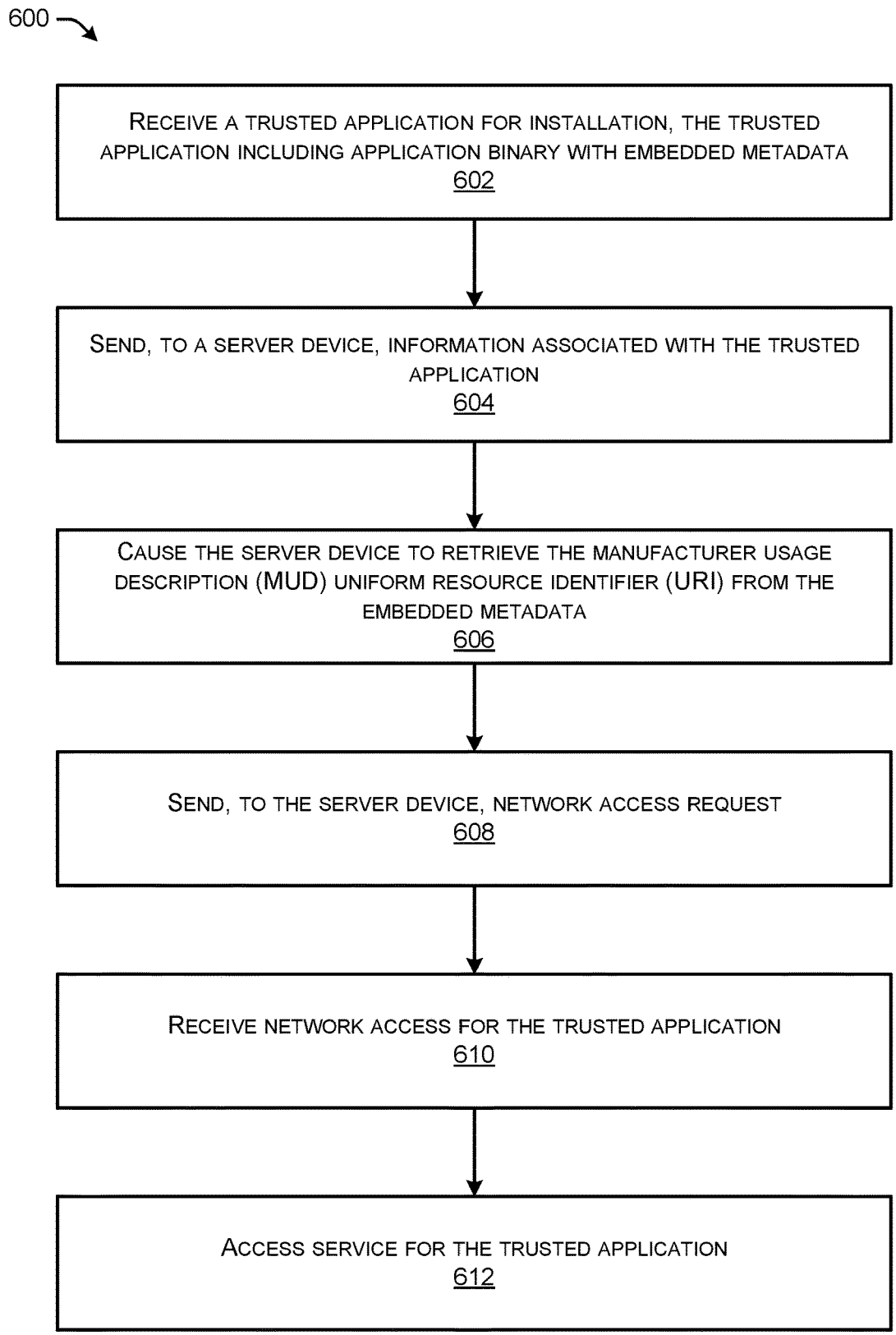
FIG. 6 illustrates a flow diagram of an example method for an individual host policy implementation of MUD files for trusted applications requested by the host device.
Figure 7:
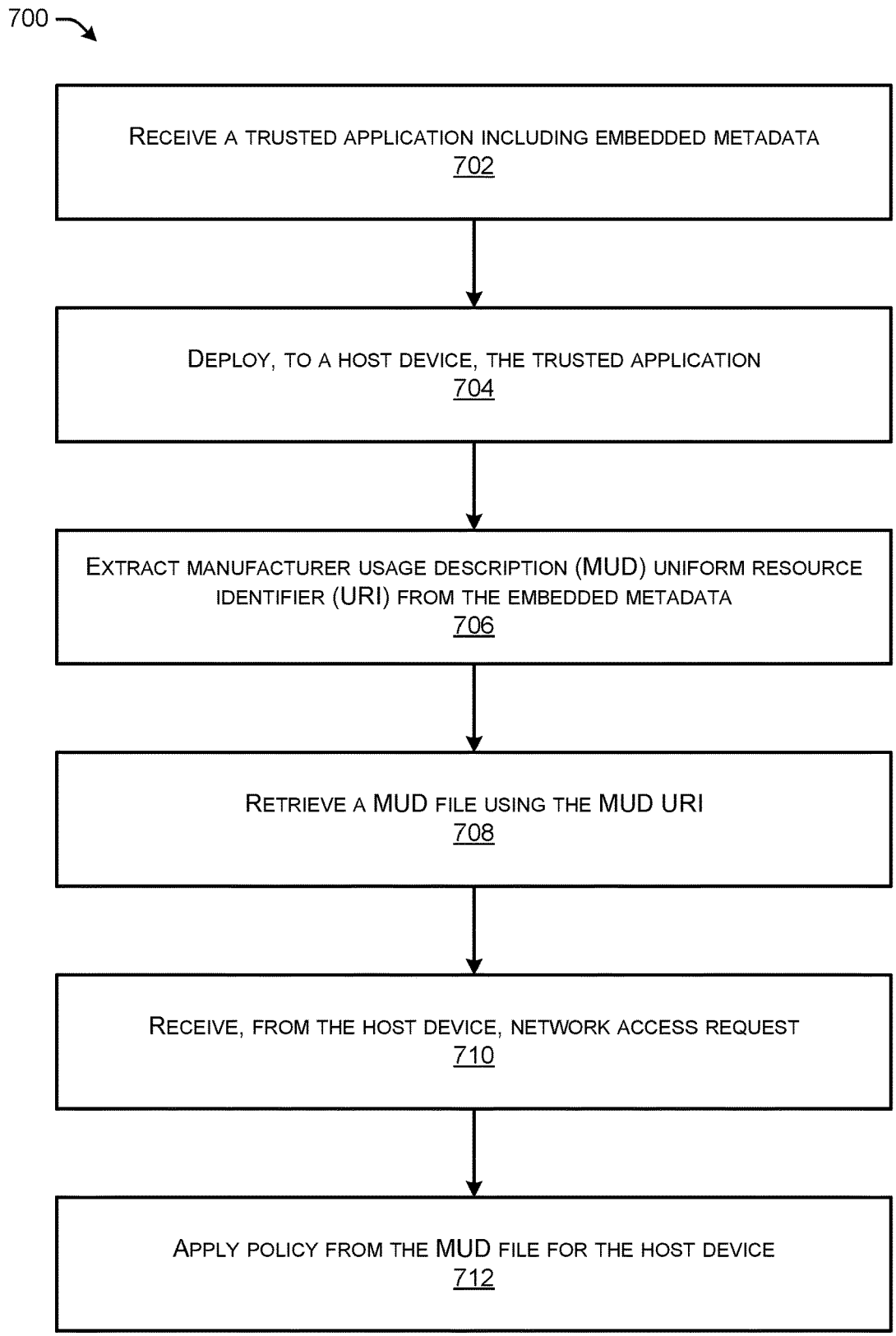
FIG. 7 illustrates a flow diagram of an example method for an individual host policy implementation of MUD files for trusted applications pushed to the host device.

FIGS. 5, 6, and 7 illustrate flow diagrams of example methods 500, 600, and 700 that illustrate aspects of the functions performed at least partly by the server device(s) 102 as described in FIGS. 1-4. The logical operations described herein with respect to FIGS. 5, 6, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5, 6, and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for an enterprise wide policy implementation of the MUD files on the system 100. The method 500 is described with reference to the system 100 and may be performed by the server device(s) 102 and/or in cooperation with any one or more of the host device(s) 104, the network access device(s) 106, or the vendor MUD server(s) 112. Of course, the method 500 may be performed in other similar and/or different environments.

At 502, the system may receive one or more trusted applications including application binary, the application binary including embedded metadata. In the system, a MUD uniform resource identifiers (URIs) may be included in the application metadata or embedded in the application binary. Additionally, and/or alternatively the MUD URIs could be embedded in the application code signing certificate.

At 504, the system may deploy, to a host device, the one or more trusted applications. As described herein, the application management component 116 may include functionality to receive trusted applications from the application vendors 110 and deploy the trusted applications to host device(s) 104. The application management component 116 may maintain an installation log to identify one or more of the applications, versions, host devices, and user associated with the application deployment. Accordingly, the policy component 118 may integrate with the application management component 116 to dynamically discover at network access time what applications a specific user and/or host device has installed. To maintain the MUD URIs pointers for the different unique MUD files, the application management component 116 may maintain a corresponding copy of each required versions of application software to extract the MUD URIs.

At 506, the system may extract one or more manufacturer usage description (MUD) uniform resource identifier (URIs) from the embedded metadata. As described herein, the application management component 116 may include functionality to extract the MUD URIs from trusted applications and provides these to policy component 118. Additionally, the policy component 118 may include functionality to discover the MUD URIs. As described herein, the application management component 116 may extract the MUD URIs from trusted applications and provides these to policy component 118. In another example, the policy component 118 may request a set of trusted applications from an application management component 116 and extract the MUD URIs. In additional examples, the policy component 118 may be manually provisioned with the set of MUD URIs for trusted applications.

At 508, the system may retrieve one or more MUD files using the MUD URIs. The policy component 118 may discover the MUD URIs that could point to the MUD files that describes the application's network access requirements. The MUD files could be hosted by the respective software vendors MUD servers. Thus, the policy component 118 can receive MUD files 126 from vendor MUD server(s) 112(1)-112(N) ("vendor MUD servers 112"), where N is any integer greater than "1," via one or more network. After receiving the MUD files, the policy component 118 may include one or more options to implement the policy rules in the MUD files.

At 510, the system may combine one or more policies for network access from the one or more MUD files. As described herein, the policy component 118 may include an enterprise wide policy that merges or unions the MUD files for all trusted applications and opens up a superset of the rules on network and firewalls.

At 512, the system may provide the network access for the one or more trusted applications based at least in part on applying the one or more policies. The system may provide an enterprise wide policy that allows all users and/or host devices to traverse the firewall and to access all required ports and domains. Accordingly, a specific user or client machine may not have all applications installed but the firewall does not attempt to limit access to just the subset of ports and domains for the subset of installed applications.

FIG. 6 illustrates a flow diagram of an example method 600 for an individual host policy implementation of MUD files for trusted applications requested by the host device. The method 600 is described with reference to the system 300 and may be performed by host device(s) 104 and/or in cooperation with any one or more of the server device(s) 102, the network access device(s) 106, or the vendor MUD server(s) 112. Of course, the method 600 may be performed in other similar and/or different environments.

At 602, the system may receive a trusted application for installation, the trusted application including application binary with embedded metadata. In the system, a MUD uniform resource identifiers (URIs) may be included in the application metadata or embedded in the application binary. Additionally, and/or alternatively the MUD URIs could be embedded in the application code signing certificate. The host device may receive the trusted applications from the multiple application vendors that may be installed on the host device, based on a request sent from the host device.

At 604, the system may send, to a server device, information associated with the trusted application. The host device(s) 104 may send an application installation report to the application management component 116. In some instances, the application installation report may include details on the applications and/or application versions installed. If the host device(s) is running a Trusted Execution Environment (TEE) then the application installation report may include a signed assertion.

At 606, the system may cause the server device to retrieve the manufacturer usage description (MUD) uniform resource identifier (URI) from the embedded metadata. The policy component 118 may receive the MUD URIs that are embedded in the trusted applications. Using the MUD URIs, the policy component 118 may retrieve the MUD files that are hosted by the application vendors 110 on their corresponding vendor MUD server(s) 112.

At 608, the system may send, to the server device, network access request. The host device(s) 104 may send an authenticate client requesting network access to the network access device(s) 106. The network access device(s) 106 may interact with the authenticator component 212 to authenticate the host device(s) 104 for the requested network access. The authenticator component 212 may instruct the policy component 118 to apply the MUD files policy for the host device(s) 104.

At 612, the system may access service for the trusted application. The policy component 118 may determine the specific applications deployed on the host device(s) 104 (e.g., by querying the application management component 116) and may also combine and/or otherwise unionize policies from the MUD files retrieved for the specific applications deployed, and may enforce policies on the firewall 108 for all users and/or client machines on the network. Thus, the specific applications may access service from the cloud service 114.

FIG. 7 illustrates a flow diagram of an example method 700 for an individual host policy implementation of MUD files for trusted applications pushed to the host device on the system 400. The method 700 is described with reference to the system 400 and may be performed by the server device(s) 102 and/or in cooperation with any one or more of the host device(s) 104, the network access device(s) 106, or the vendor MUD server(s) 112. Of course, the method 700 may be performed in other similar and/or different environments.

At 702, the system may receive a trusted application including embedded metadata. In the system, a MUD uniform resource identifiers (URIs) may be included in the application metadata or embedded in the application binary. Additionally, and/or alternatively the MUD URIs could be embedded in the application code signing certificate.

At 704, the system may deploy, to a host device, the trusted applications. As described herein, the application management component 116 may include functionality to receive trusted applications from the application vendors 110 and deploy the trusted applications to host device(s) 104. The application management component 116 may maintain an installation log to identify one or more of the applications, versions, host devices, and user associated with the application deployment. Accordingly, the policy component 118 may integrate with the application management component 116 to dynamically discover at network access time what applications a specific user and/or host device has installed. To maintain the MUD URIs pointers for the different unique MUD files, the application management component 116 may maintain a corresponding copy of each required versions of application software to extract the MUD URIs.

At 706, the system may extract one or more manufacturer usage description (MUD) uniform resource identifier (URIs) from the embedded metadata. As described herein, the application management component 116 may include functionality to extract the MUD URIs from trusted applications and provides these to policy component 118. Additionally, the policy component 118 may include functionality to discover the MUD URIs. As described herein, the application management component 116 may extract the MUD URIs from trusted applications and provides these to policy component 118. In another example, the policy component 118 may request a set of trusted applications from an application management component 116 and extract the MUD URIs. In additional examples, the policy component 118 may be manually provisioned with the set of MUD URIs for trusted applications.

At 708, the system may retrieve a MUD file using the MUD URI. The policy component 118 may discover the MUD URIs that could point to the MUD files that describes the application's network access requirements. The MUD files could be hosted by the respective software vendors MUD servers. Thus, the policy component 118 can receive MUD files 126 from vendor MUD server(s) 112(1)-112(N) ("vendor MUD servers 112"), where N is any integer greater than "1," via one or more network. After receiving the MUD files, the policy component 118 may include one or more options to implement the policy rules in the MUD files.

At 710, the system may receive, from the host device, network access request. The host device(s) 104 may send an authenticate client requesting network access to the network access device(s) 106. The network access device(s) 106 may interact with the authenticator component 212 to authenticate the host device(s) 104 for the requested network access. The authenticator component 212 may instruct the policy component 118 to apply the policies in the MUD files for the host device(s) 104.

At 712, the system may apply policy from the MUD file for the host device. In some examples, the policy component 118 may determine the specific applications deployed on the host device(s) 104 (e.g., by querying the application management component 116) and may also combine and/or otherwise unionize policies from the MUD files retrieved for the specific applications deployed, and may enforce the combined policies on the firewall 108 for the host device. Thus, the specific applications on the host device may access service from the cloud service 114.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to:
receive one or more trusted applications including application binary, the application binary including embedded metadata;
deploy, to a host device, the one or more trusted applications;
extract one or more manufacturer usage description (MUD) uniform resource identifier (URIs) from the embedded metadata, wherein the MUD URI is signed by an application vendor;
receive, from a server device and based at least in part on the MUD URI being signed by the application vendor, one or more MUD files using the MUD URIs;
combine one or more policies for network access from the one or more MUD files; and
provide the network access for the one or more trusted applications based at least in part on applying the one or more policies.

2. The system of claim 1, wherein a MUD URI of the MUD URIs includes a pointer to an associated MUD file hosted at an internet protocol (IP) address for a MUD server.

3. The system of claim 1, wherein a MUD file of the MUD files describes network access requirements for an associated application.

4. The system of claim 3, wherein the MUD file includes at least one of a port or a firewall access.

5. The system of claim 1, wherein receiving the one or more MUD files using the MUD URIs comprises:
determine an internet protocol (IP) address for a MUD server using a MUD URI of the MUD URIs; and
send, to the server device, a request for a MUD file of the one or more MUD files.

6. A method comprising:
- receiving, at a computing device, a trusted application for installation, the trusted application including application binary with embedded metadata, wherein the embedded metadata includes a manufacturer usage description (MUD) uniform resource identifier (URI) that is signed by a software vendor;
- sending, to a server device and based at least in part of the MUD URI being signed by the software vendor, information associated with the trusted application;
- causing the server device to retrieve the manufacturer usage description (MUD) uniform resource identifier (URI) from the embedded metadata;
- sending, to the server device, network access request for the trusted application; and
- accessing, by the computing device, services associated with the trusted application based at least in part on receiving network access.

7. The method of claim 6, wherein receiving the trusted application is based at least in part on sending an installation request from the computing device.

8. The method of claim 6, wherein the application binary is signed by the software vendor, and the MUD URI includes a pointer to an associated MUD file hosted at an internet protocol (IP) address for a MUD server.

9. The method of claim 8, further comprising:
- receiving, at the computing device, a second trusted application for installation, the second trusted application including second application binary signed by a second software vendor.

10. The method of claim 6, further comprising:
- determining that the computing device is running a trusted execution environment (TEE); and
- determining that sending the information associated with the trusted application further indicates a signed assertion.

11. The method of claim 6, further comprising:
- receiving, at the computing device, an updated client for the trusted application;
- sending, to the server device, information associated with the updated client for the trusted application; and
- causing the server device to retrieve a second MUD URI from second embedded metadata in the updated client.

12. The method of claim 6, wherein causing the server device to retrieve the MUD URI further includes causing the server device to retrieve a MUD file associated with the trusted application.

13. The method of claim 12, wherein the MUD file includes one or more network access requirements for the trusted application.

14. A method comprising:
- receiving a trusted application including embedded metadata;
- deploying, to a host device, the trusted application;
- extracting one or more manufacturer usage description (MUD) uniform resource identifier (URIs) from the embedded metadata, wherein the MUD URI is signed by an application vendor;
- receiving, from a server device and based at least in part on the MUD URI being signed by the application vendor, a MUD file using the MUD URI;
- receiving, from the host device, network access request; and
- applying network access policy from the MUD file for the host device.

15. The method of claim 14, wherein the embedded metadata is included in an application binary signed by the application vendor, and the MUD URI includes a pointer to an associated MUD file hosted at an internet protocol (IP) address for a MUD server.

16. The method of claim 15, wherein the server device includes a MUD server platform hosted by the application vendor.

17. The method of claim 14, wherein the trusted application is a first trusted application, the network access policy is a first network access policy, and further comprising:
- determining a second trusted application deployed on the host device;
- extracting a second MUD URI associated with the second trusted application; and
- receiving, from a second server device, a second MUD file using the second MUD URI.

18. The method of claim 17, further comprising:
- combining the first network access policy from the MUD file with a second network access policy from second MUD file to form a first combined policy;
- applying the first combined policy to enforce network access for the host device; and
- determining that the host device has network access for at least the first trusted application and the second trusted application.

19. The method of claim 18, further comprising:
- deploying, to a second host device, the first trusted application;
- determining a third trusted application deployed on the second host device;
- combining the first network access policy with a third network access policy from a third MUD file to form a second combined policy;
- applying the second combined policy for the second host device; and
- determining that the second host device has network access for at least the first trusted application and the third trusted application.

20. The method of claim 19, further comprising:
- combining the first combined policy with the second combined policy to form a super policy; and
- applying the super policy to enforce network access for all devices on a network.

* * * * *